(12) United States Patent
Singh (10) Patent No.: US 12,213,493 B2
(45) Date of Patent: Feb. 4, 2025

(54) METHOD FOR PRESERVING FRESH FOOD (71) Applicant: Benjamin Amit Singh, Bielefeld (DE)

(72) Inventor: Benjamin Amit Singh, Bielefeld (DE)

(73) Assignee: Benjamit Amit Singh, Bielefeld (DE)

( * ) Notice: Subject to any disclaimer, the term of this patent is extended or adjusted under 35 U.S.C. 154(b) by 32 days.

(21) Appl. No.: 17/636,230

(22) PCT Filed: Oct. 15, 2021

(86) PCT No.: PCT/EP2021/078675
§ 371 (c)(1),
(2) Date: Feb. 17, 2022

(87) PCT Pub. No.: WO2022/079277
PCT Pub. Date: Apr. 21, 2022

(65) Prior Publication Data
US 2023/0413835 A1    Dec. 28, 2023

(30) Foreign Application Priority Data
Oct. 16, 2020 (EP) .................................. 20202194

(51) Int. Cl.
A23B 7/157    (2006.01)
A23B 7/154    (2006.01)
A23L 3/3499   (2006.01)
A23L 3/3544   (2006.01)

(52) U.S. Cl.
CPC .............. A23B 7/157 (2013.01); A23B 7/154 (2013.01); A23L 3/3499 (2013.01); A23L 3/3544 (2013.01)

(58) Field of Classification Search
CPC ....... A23B 7/157; A23B 7/154; A23L 3/3499; A23L 3/3544

USPC ......................................................... 426/321
See application file for complete search history.

(56) References Cited

U.S. PATENT DOCUMENTS 5,919,507 A       7/1999   Beelman et al.
6,500,476 B1 *   12/2002   Martin ................... A23B 7/157
                                                           426/310
2012/0045555 A1   2/2012   Ricks
2018/0192660 A1   7/2018   Singh

FOREIGN PATENT DOCUMENTS

EP   0141875 A1       5/1985
EP   1574135 A1       9/2005
EP   3338563 A1       6/2018
JP   6-181684 A       7/1994
KR   10-1848788 B1    4/2018
KR   2013-0141017 B1  11/2021
WO   94/12041 A1      6/1994
WO   00/30460 A1      6/2000
WO   2013/079903 A1   6/2013

OTHER PUBLICATIONS

International Search Report for PCT/EP2021/078675 dated Dec. 13, 2021, 4 pages.
International Search Report, Dec. 2, 2021, PCT/EP/2021/078675.
European Search Report, Mar. 12, 2021, EP 20 20 2194.

* cited by examiner

Primary Examiner — Brent T O'Hern
(74) Attorney, Agent, or Firm — Christopher Jan Korff (57) ABSTRACT The present invention relates to a new process for preserving fresh food, in particular fresh produce, by applying an alkaline solution and subsequently an acidic solution onto the fresh food.

18 Claims, 3 Drawing Sheets

METHOD FOR PRESERVING FRESH FOOD

CROSS-REFERENCE TO RELATED APPLICATIONS

This application claims priority to PCT Patent Application No. PCT/EP2021/078675 filed 15 Oct. 2021, and to European Patent Application 20 202 194.5 filed 16 Oct. 2020, both of which are hereby incorporated by reference in their entireties.

TECHNICAL FIELD

The present invention relates to the technical field of food preservation, in particular to the preservation of fresh food, such as fresh produce like fruit, vegetables and herbs.

BACKGROUND OF THE INVENTION

Food preservation involves preventing the growth of undesired microorganisms, slowing of oxidation, and inhibition and/or reversal of processes leading to visual deterioration, such as the browning reaction of fresh food, in particular fresh cut produce, in particular of vegetable, fruits and herbs. Many processes applicable to preserve food are known, which may involve various food preservation methods. In many processes, the character of the processed food regarding appearance and taste changes fundamentally. In contrast to such processes, it is desirable in many cases to make food more durable and to extend its storability while preserving as many characteristics, such as flavor, texture, scent and optical appearance, as possible. Further, many known processes are only suitable to deal with one or selected food preservation aspects such as prevention of browning or slowing of oxidation but not at the same time with inhibition of microorganisms such as bacteria and yeasts, or vice versa. In particular, for the preservation of fresh produce, such as fresh fruits, vegetables and herbs, it is desired to provide a preservation process, which is capable to solve at the same time the most relevant preservation aspects reduced oxidation, anti-browning treatment and inhibition or reduction of microorganisms such as bacteria, fungi and/or yeasts. Undesired browning of fresh produce can on the one hand occur due to oxidation or enzymatic reactions (also called enzymatic browning) and on the one hand undesired browning can be observed after preservation treatments due to discoloration caused by tissue damage.

A method for the preservation of fresh produce, in particular of cut fruit and vegetables, is described in EP3338563A1, wherein an aqueous solution comprising potassium carbonate and at least one source of ascorbate and/or isoascorbate ions with a very specific molar ratio in the range of 1.00:0.95 to 1.00:0.50 is used to prevent browning. Therein, the solution in the form of a mixture of all components is applied onto fresh produce in order to preserve the fresh produce and extend the shelf life of the processed fruit and vegetables. The mixture described therein is not used for preventing deterioration by microorganisms but has antioxidative and anti-browning properties.

The patent KR101848788B1 describes fruit processing comprising a fruit preparation step, a disinfecting step, cutting or removal of fruit parts, depending on the type of fruit, and a pre-treatment step in which the skin is removed, a washing step in which the pretreated fruits are immersed in an immersion liquid and washed and a dehydration step of the washed fruit. Specifically, the disinfection comprises application of 200 ppm chlorine and the washing step comprises applying a mixture of an aqueous solution containing ascorbic acid and sodium hydrogen carbonate.

The patent US2012/0045555A1 describes a process for preserving freshly cut fruit by application of a fresh fruit preservation solution containing water, ascorbic acid, calcium ascorbate, carbohydrate, sodium chloride, magnesium chloride, potassium bicarbonate, malic acid.

The patent application WO94/12041 describes a process for preserving fresh cut of fruit or vegetables to retain their natural appearance, including the soaking of cut fruit or vegetables in a dilute aqueous solution comprising sodium and/or potassium ions, calcium ions, chloride ions, ascorbic acid or ascorbate ions (or their isomers or derivatives) and citric acid or citrate ions or malic acid or malate ions (or their isomers or derivatives), for a short period of time.

The application of metal ascorbates or combinations of ascorbic acids and metal salts in treating fruit, vegetables and other food for reduction of microbial contamination, prevention of coloring and preservation is also disclosed in JP06-181684, EP0141875 and WO00/30460, which necessarily comprise ascorbic acid or a salt thereof, sodium carbonate or potassium carbonate, as well as citric acid or a salt thereof and a sulfite or bisulfite compound, each of them being present in an amount of 10 to 40%. The solutions described therein contain all components in a single mixture.

US2012/045555A1 relates to a fresh fruit preservative, in particular by reducing oxidation of the exposed cut surfaces of the fruit. The preservative comprises ascorbic acid, calcium ascorbate, carbohydrate, sodium chloride, magnesium chloride, potassium bicarbonate and malic acid in a single mixture.

KR20130141017 describes liquid compositions for preventing browning of fruits, the compositions comprising 1.5 wt.-% vitamin C, 0.3 wt.-% potassium carbonate and 98.2 wt.-% water, resulting in a molar ratio of potassium cations to ascorbate anions of 1:1.96, wherein the components are present in a single mixture.

Therewith, the state of the art provides primarily methods for preserving fresh produce wherein a single preservation solution is applied in one step onto the fresh produce. The known one-step preservation mixtures can comprise ascorbate and/or isoascorbate, often in combination with carbonates or bicarbonates. Such compositions are in particular suitable to prevent oxidation and browning of the fresh produce but are less suitable to prevent deterioration by microorganisms. If at all, such known and described preservatives have only weak disinfection properties and buffer effects or side reactions within the mixtures can occur which are opposed to a strong antimicrobial effect. Also, the combination of active ingredients in a single solution for inducing several, very different effects simultaneously, such as antimicrobial effect, antioxidative effect and anti-browning effect, provides problems in preparing a suitable and effective formulation. Additionally, solutions for preserving fresh produce from deterioration by microorganisms make use of active disinfectants or sanitizing compounds, which may have harmful potential and are not allowed for food preservation worldwide, such as e.g. chlorine-based disinfectants. Such strong disinfectants are also very often not accepted by the consumer. Undesired taste influencing residues on the treated food must also be avoided. The known preservation compositions fail to tackle the antimicrobial character in their process and only provide the composition of the final solution. Usually, foods are disinfected with a common sanitizer, and then treated with an ascorbate solution.

Food preservation methods using two- or more separate treatment steps with two or more different preservative solutions are known for example from WO2013/079903, EP1574135A1, U.S. Pat. Nos. 6,500,476 and 5,919,507.

WO2013/079903 provides a method for protection against enzymatic browning by using a solution of calcium ascorbate and an enzyme inhibitor, which is an acidulant capable of reducing the pH to below 4. The method described therein may comprise an optional first step of pre-dipping the produce into a solution with a chelating agent.

EP1574135A1 describes a two-step preservation procedure wherein a first acid solution with a pH of 1.5 to 4.5 is applied to the produce to reduce microbial concentration, followed by a second anti-browning treatment by applying a solution with a pH of 7 to 9 containing a chelating agent and an antioxidant.

While WO2013/079903 provides no treatment for inhibiting or reducing microbial deterioration at all, EP1574135A1 uses an acidic solution to inhibit microorganisms. Such an acid treatment leads to undesired influence of the taste of the treated produce and provides only insufficient anti-microbial efficacy. Further, both methods require the use of chelating agents, which is not desired due to food regulatory reasons and a very limited admissibility in food processing in the European Union.

U.S. Pat. No. 6,500,476 describes a three-step preservation procedure, comprising a first step of contacting mushrooms with a high pH alkaline solution of pH 10.5 to 11.5 to reduce microorganisms, followed by a second neutralization step with a neutralizing buffer of organic acids and a salt of an organic acid, and subsequently followed by a third step of anti-browning treatment with antioxidants, a source of calcium and a chelating agent. Therein, the first alkaline solution is preferably prepared with carbonates and bicarbonates. The second neutralizing solution is substantially free from erythorbic acid and sodium erythorbate. The third anti-browning solution comprises sodium erythorbate, erythorbic acid, ascorbic acid or calcium ascorbate (or L-cysteine) as the browning inhibitor. Therewith, the process described therein needs an additional washing and neutralization step before carrying out the anti-browning treatment.

Similarly, U.S. Pat. No. 5,919,507 describes a preservation procedure with a high pH alkaline solution of pH 9.5 to 11.0 to reduce microorganisms and makes use of a two-step treatment, wherein the second treatment step comprises washing and neutralizing the treated mushrooms with a pH neutralizing solution of erythorbic acid and sodium erythorbate in a specific ratio of 1:4. Similar as in U.S. Pat. No. 6,500,476 the two-step process described in U.S. Pat. No. 5,919,507 preferably uses carbonates and bicarbonates for preparing the alkaline solution and preferably adds EDTA as a chelating agent to the second neutralizing and anti-browning solution.

As mentioned above, the use of chelating agents to achieve anti-browning is less desired due to regulatory limitations, in particular in the treatment of fresh produce. Further, the inventors of the present invention found that an antimicrobial treatment as described in U.S. Pat. Nos. 6,500, 476 and 5,919,507 with solutions having a pH of 11.5 or less provides only limited antimicrobial efficacy. Even if these prior art documents can provide results of good total microbial plate counts, this has only limited significance regarding shelf-life of the products as a product with a high total microbial count can still be marketable. U.S. Pat. No. 5,919,507 explains in column 2, lines 62 to 66 that a high alkaline preservative treatment is limited with respect to the upper pH limits and that solution exposure time must be carefully controlled to optimize bacterial destruction while avoiding counterproductive overexposure to extremes of pH, resulting in chemical damage to tissue.

The invention described herein combines both aspects, anti-browning/anti-oxidation and inhibition of microorganisms, while being more effective, and provides a cost and effort effective two-step procedure. Further, the present invention allows to provide a preservative process without the negative aspects of common sanitizers, such as deterioration of the physical and characteristic properties of the treated produce and without the regulatory limitations of common anti-browning chelators. Surprisingly, the inventors of the present invention further found that with the new process described herein it became possible to apply even higher alkaline anti-microbially effective solutions with pH values>11.5 to fresh produce without deterioration or chemical damage of the treated produce, as it would have been expected from the teaching of U.S. Pat. No. 5,919,507. In particular, with the method of the present invention undesired browning due to discoloration caused by tissue damage after preservation treatment can be avoided.

Problem to be Solved

Increasing transport distances and the requirement for providing and storing convenient food, especially fresh cut produce, e.g. in schools, cafeterias or fast-food restaurants, requires extended preservation and shelf-life. Shelf-life extension is limited by microbial contamination due to inefficient antimicrobial pre-treatment. In addition, extended shelf-life and preservation against deterioration comprises protection of the fresh produce against visual and textural deterioration, e.g. due to oxidation, shrinking and undesired browning. It is therefore desirable, to provide an improved effective antimicrobial pre-treatment, which does not change the structure, taste and appearance of the food in an unacceptable extend and which can prolong shelf-life of the fresh produce.

The problem to be solved by the present invention is the provision of an improved method for the preservation of fresh produce. In particular, the microbial contamination should be controlled, while undesired effects on appearance, taste and texture, such as e.g. undesired browning reaction due to oxidation or due to discoloration caused by tissue damage after preservation treatment, change in structure, crispness, taste influencing residues, and similar changes should be avoided. In a further aspect, it is desirable to provide an effective preservation process, which combines the two most important preservation aspects in the treatment of fresh produce and which provides a highly effective anti-microbial treatment and anti-browning/anti-oxidative treatment at the same time. Such preservation process should avoid undesired browning due to discoloration caused by tissue damage after preservation treatment. This means, that a particular object of the invention relates to providing a new highly effective food preservation process, which is balanced between high alkaline pH to achieve highly efficient antimicrobial activity and avoiding undesired textural or structural deterioration, such as etching, chemical damage or discoloration (browning) of the treated produce.

The process should be easy to apply and therewith cost and effort effective. The process should further be suitable to avoid regulatory limitations, in particular by achieving anti-browning even without the use of chelating agents. In a particular aspect, the new process should provide a highly effective preservation method allowing to combat not only bacteria but also being highly effective against microbial deterioration caused by yeasts.

The invention solves this problem, by providing a new method for preserving fresh produce, comprising the application of two different solutions in a two-step procedure as described herein in detail. The new process allows improved performance regarding antimicrobial contamination, including activity against bacteria and yeasts, and therewith extension of shelf life, while maintaining texture and crispness as well as taste properties and good optical appearance. Foods treated with the claimed process show that yeast, bacteria and fungi can be reduced by up to 3 log. At the same time their sensorial character is strongly improved in comparison with common process techniques. Surprisingly, the new process does not only inhibit undesired browning-effects of fresh produce but is able to reverse browning to a certain extent, when applied to fresh produce, such as in particular cut fruits, vegetables and herbs. Therewith, the new process surprisingly turned out to provide a highly effective preservation method which allows to avoid undesired browning due to discoloration caused by tissue damage after preservation treatment. The solutions applied in the new process are specifically designed to perform their specific functions to maximize the effectiveness and do not, like many other single solutions, perform multiple effects simultaneously. Further, the new process allows a more effective and safe use of the preservation solutions and stable storing of the preservative solutions over a long time without deterioration, for example due to precipitation of the active compounds.

DETAILED DESCRIPTION OF THE INVENTION

The present invention relates to a method for preserving fresh food, such as in particular fresh produce, comprising the following steps:
(a) providing an aqueous solution (1), wherein the solution (1) is an alkaline solution with a pH value 10.0;
(b) providing an aqueous solution (2), comprising 0.5% to 25% w/w ascorbate and/or isoascorbate ions;
(c) applying the solution (1) on the fresh food; and
(d) in a subsequent step applying the solution (2) on the same fresh food.

The fresh food according to the present invention is preferably fresh produce.

The solution (1) is an alkaline solution with a pH value≥10.0, preferably ≥10.5, more preferably ≥10.9, even more preferably ≥11.0, even more preferably ≥11.5, most preferably 12.0. It is most preferred that the alkaline solution (1) has a pH of >11.0, more preferred of 11.5, most preferred of ≥12.0. The alkaline solution (1) must be composed to be effective in order to disinfect the treated fresh food, in particular fresh produce, and should prevent further microbial contamination, delay growth of microorganisms and to a certain extend reduce microorganism contamination on the fresh food. The alkaline solution (1) should be effective against one or more of the group of bacteria, yeasts and fungi, in particular efficacy against at least bacteria and yeasts is desirable. It turned out that sufficient activity against yeasts can be achieved by applying an alkaline solution having a pH of >11.0, preferably of 11.5, most preferred of ≥12.0.

In the sense of the present invention, the pH value of the solutions is measured with a common laboratory pH meter for aqueous solutions at room temperature (20° C.±5° C.), making use of electrochemical determination of pH value.

Suitable alkaline compounds for preparing the alkaline solution (1) can be selected from alkali or earth alkali metal salts, or a mixture thereof. Preferred alkali or earth alkali metal salts used for preparing the solution (1), are sodium, potassium, calcium and magnesium salts, or mixtures thereof. More preferably sodium or potassium salts or mixtures thereof are used. Preferably, hydroxides, carbonates and bicarbonates are used for preparing the solution (I).

Among the alkaline compounds, hydroxides are preferred, such as in particular sodium and potassium hydroxide, which are among the alkali metals the strongest, most stable and soluble bases of the hydroxides. Using a strong base can ensure a minimum of microbial infestation on the processed food due to its high antimicrobial and disinfecting potential.

A preferred embodiment of the invention relates to a method for preserving fresh food, wherein the solution (1) comprises at least one hydroxide, selected from the group consisting of calcium hydroxide, sodium hydroxide and potassium hydroxide, or mixtures therefrom, preferably sodium hydroxide and potassium hydroxide, or mixtures therefrom. Although the alkaline solution (1) may comprise the at least one hydroxide in mixture with one or more carbonates, in a preferred embodiment the solution (1) does not comprise a carbonate compound.

The at least one hydroxide in the solution (1) is preferably used in a concentration of at least 0.01% w/w, preferably of at least 0.1%, more preferably of at least 0.5% w/w and most preferably of at least 1.0% w/w.

The upper limit of at least one hydroxide in the solution (1) is preferably 5.0% w/w, more preferably 4.0% w/w, more preferably 3.0% w/w and most preferably 2.0% w/w.

In a further preferred embodiment, the solution (1) comprises at least one hydroxide with a concentration of 0.01% to 5.0% w/w, preferably, with a concentration of 0.1% to 4.0% w/w, more preferably with a concentration of 0.5% to 3.0% w/w and most preferably with a concentration of 1.0% to 2.0% w/w. A suitable range can be selected from the lower and upper values in accordance with the specific process conditions, composition of the solution (2) and the food to be treated.

These concentration ranges and limits allow sufficient reduction of microbial infestations on the processed food on the one hand, without causing irreversible damage and taste deterioration of the processed food on the other hand.

The selected concentration ranges provide a good balance between preservation activity and protection of the treated food against textural or sensorial deterioration.

It is further preferred that the solutions used in the method of the present invention are free of potentially harmful and aggressive disinfectants and that the method does not comprise a disinfection step using such undesired disinfectants. Undesired and avoided disinfectants comprise in particular chlorine-based disinfectants, such as sodium chlorite and other salts of chlorous acid, hypochlorites, hypochlorous acid, and chlorine dioxide, but also peroxyacetic acid, quaternary ammonium compounds, ethyl alcohol, isopropyl alcohol, formaldehyde and hydrogen peroxide. Such undesired disinfectants are potentially harmful for food or for the consumer. The solutions used in the present invention are preferably free of these compounds.

The solution (2) comprises 0.5% to 25.0% w/w ascorbate and/or isoascorbate ions.

Preferably the solution (2) comprises at least 0.5, at least 0.75, at least 1.0, at least 1.5, at least 0.75, at least 2.0% w/w ascorbate and/or isoascorbate ions.

The upper limit of the ascorbate and/or isoascorbate ions in solution (2) is 25.0% w/w, preferably 24.0%, 23.0, 22.0, 21.0, 20.0, 19.0, 18.0, 17.0, 16.0, 15.0, 14.0, 13.0, 12.0, 11.0, 10.0, 9.0, 8.0, 7.0, 6.0% w/w.

More preferably the solution (2) comprises 1.0% to 15.0% w/w, even more preferably 1.5% to 10% w/w and most preferably 2.0% to 6.0% w/w ascorbate and/or isoascorbate ions.

A suitable range can be selected from the lower and upper values in accordance with the specific process conditions, composition of the solution (1) and the food to be treated.

In principle the ascorbate and/or isoascorbate ions can derive from ascorbic acid and isoascorbic acid. Preferably, a salt of ascorbic acid and/or isoascorbic acid is used for preparing the solutions of the present invention, such as preferably an alkali or earth alkali metal salt of ascorbic acid or isoascorbic acid, or mixtures thereof. Preferred salts are selected from calcium ascorbate, calcium isoascorbate, potassium ascorbate, potassium isoascorbate, sodium ascorbate, sodium isoascorbate, magnesium ascorbate, magnesium isoascorbate, and mixtures thereof. The use of potassium ascorbate, potassium isoascorbate, sodium ascorbate, sodium isoascorbate, or mixtures thereof is particularly preferred. Specifically, these alkali and earth alkali metals are required as essential nutrients by organisms to perform functions necessary for life, as they cannot be synthesized biochemically by the human body. Therefore, the use of these ascorbate and/or isoascorbate salts are beneficial. Further, acerola may be used as a source of ascorbate ions or any other suitable ascorbic acid (vitamin C) rich source.

It is also possible to use derivates of ascorbate and/or isoascorbate, like ascorbate esters or ethers, such as in particular ascorbyl palmitate or ethyl ascorbic ether.

The solution (2) has a preferred pH value of ≤pH 8.0, preferably of ≤pH 7.5, more preferably of ≤pH 7.0, more preferably of ≤pH 6.5, more preferably ≤pH 6.0, more preferably of ≤pH 5.5, more preferably of ≤pH 5.0, more preferably of ≤pH 4.5, even more preferably ≤pH 4.0 and most preferably a pH value between of 3.0 and 5.0.

The solution (2) effects neutralization of the alkaline solution and thereby stops the alkaline activity and impacts on the treated foods. However, at the same time the solution (2) exhibits anti-browning/antioxidant properties without deterioration of the sensory and optical properties of the treated produce.

In a particular aspect of the invention, the presence of chelating agents, such as e.g. EDTA, in either of the used solutions (1) and/or (2) is excluded and not necessary to achieve the desired effects.

The solution (1) and the solution (2) are generally aqueous solutions and are accordingly based on water as the solvent. In the sense of the present invention, water includes drinking water as supplied either publicly by local government authorities or privately by the food business itself.

In addition, further solvents can be used other than water, provided they are water-miscible and suitable as food additives, such as e.g. approved by governmental regulations, for example in the German Food Additive Approval Ordinance (Zusatzstoff-Zulassungsverordnung (ZZuIV)) according to the Foodstuffs and Feedstuffs Code (Lebensmittel- and Futtermittelgesetzbuch (LFGB)), or classified as GRAS (generally recognized as safe) food substances by the FDA. Examples of such additional solvents are glycerol and propylene glycol, which are fully miscible with water.

The solution (1) and the solution (2) can independently be applied by spraying, sprinkling, dousing, dipping or immersion or combinations thereof, which corresponds to steps (c) and (d) of the method described above.

The term spraying according to the invention relates to any technical process in which an aerosol is created and aimed at the fresh produce to be conserved. This may be by a pump spray system or a propellant-based spray system. The droplet size of the solution (1) or the solution (2) is not limited to any size range, but preferably the droplets are of microscopic size.

The term sprinkling according to the invention relates to any technical process in which drops and/or droplets of the solution (1) or the solution (2) are sprinkled onto the material like fresh produce, for instance by a sprinkler system.

The term dousing according to the invention relates to any technical process in which the solution (1) or the solution (2) is doused or poured onto the material like fresh produce.

The technical processes referred to as spraying, sprinkling or dousing can be applied to the fresh produce being positioned on a grid, in a tray or on a conveyor belt, but are in no way restricted by these modes of application.

The terms dipping and immersion according to the invention relate to any technical process in which material like fresh produce is brought into a reservoir of the solution (1) or the solution (2) in a way providing that at least parts, but preferably the entire surface is at least temporarily covered by the solution, or in a way that the fresh food, like fresh produce, is floating on the surface of the solution (1) or the solution (2).

Furthermore, any other means suitable for covering the surface of the fresh food, like fresh produce, to be preserved with the solution (1) or the solution (2) can be applied in the method according to the invention.

Preferably, the solution (1) and/or the solution (2) are independently applied for at least 5 seconds. Application time can vary for solution (1) and solution (2) and/or depending on the processed food. Preferably, the solution (1) and/or the solution (2) are independently applied for less than 60 seconds.

The time between the application of solution (1) and solution (2) preferably does not exceed 1 h, more preferably does not exceed 30 minutes and most preferably is between 30 seconds and 10 minutes. On one hand, microbial infestations on the fresh food are declining more as longer solution (1) remains on the fresh food without the application of solution (2). On the other hand, the fresh food may be etched and saponification may occur, leaving unpleasant residues on the treated food. This can also lead to undesired browning-effects on the fresh food, in particular on fresh produce. These side effects are eliminated or suppressed with applying the solution (2), which neutralizes the solution (1).

The ascorbate-containing solution (2) eliminates any residues of the hydroxide solution (1) by neutralization. Furthermore, it forms derivatives of Vitamin C with the remaining sodium and/or potassium ions stemming from hydroxide solution (1). This neutralization process results in leaving only harmless substances like e.g. sodium ascorbate and ascorbic acid on the food. Both are widely accepted and used food additives. The solution (2) further prevents the browning-reaction, strengthens the structure and surprisingly can even reverse potential browning-reactions induced by the application of solution (1) onto the food, in particular fresh produce. Applying only the ascorbate solution (2) may improve the color of the food and prevents discoloration, however, without the prior treatment with the solution (1) the solution (2) alone will not accomplish any bacterial log reduction. Internal studies and literature show, that the sole application of only fruity acids (pH 2.4) does not lead to any log reduction of bacteria. Acids further leave an acidic taste on the fresh produce to be consumed and it is preferred to avoid such acidification but maintain the natural food taste.

Preferably, the solution (2) is applied for at least 5 seconds and can vary depending on the food and the amount and composition of the solution (1) applied on the same fresh food. This minimum duration ensures a comprehensive anti-microbial effect due to the solution (1).

Preferably, there is no additional washing or neutralization step applied between treatment with solution (1) and treatment with solution (2) of the invention. This means, a two-step treatment is preferred.

The duration of the application of the solution (1) can be extended by the addition of ascorbate/isoascorbate ions to the solution (1), as described below in more detail, as well as by the subsequent use of the solution (2).

The composition of solution (2), comprising ascorbate and/or isoascorbate ions, is controlled to have an ascorbate/isoascorbate concentration high enough to neutralize all hydroxides of solution (1). The neutralization vice versa encounters the sour taste of the ascorbate and/or isoascorbate solution.

Optionally, the solution (1) and/or the solution (2) according to the invention furthermore contain one or more excipients suitable for the use in food, in particular fresh produce selected from the group of anti-adherents, binders, colors, flavors, lubricants, preservatives, sweeteners, such as in particular listed in governmental regulations, for example in the German Food Additive Approval Ordinance (Zusatzstoff-Zulassungsverordnung (ZZuIV)) according to the Foodstuffs and Feedstuffs Code (Lebensmittel- and Futtermittelgesetzbuch (LFGB)), or classified as GRAS (generally recognized as safe) food substances by the FDA. Depending on the further excipients the application time of the solution(s) can be shortened or prolonged or the microbial reduction effect can be enhanced.

In a preferred embodiment of the invention, the solution (1) and/or the solution (2) contain less than 30 weight-% of an excipient or excipients, more preferably less than 20 weight-%, even more preferably less than 10 weight-%, and most preferably less than 5 weight-% of excipients.

In a further embodiment the solution (1) may also contain, in addition, ascorbate and/or isoascorbate ions. By adding small amounts of ascorbate and/or isoascorbate ions already to the alkaline solution (1), the process of etching and the browning-reaction on fresh food, in particular fresh produce can surprisingly be delayed significantly while the pH of the solution does not vary due to the buffering effect of the ascorbate and/or isoascorbate ions. It was expected that an alkaline solution (1) additionally containing ascorbate and/or isoascorbate ions would etch the fresh food, in particular fresh produce, in the same amount of time as in case of using a solution (1) without ascorbate and/or isoascorbate ions. The surprising delay of the etching significantly improves the suitability of the process due to the possibility of increasing the application time of the alkaline solution (1) to exceed the disinfection period.

In embodiments, wherein ascorbate and/or isoascorbate ions are added to the alkaline solution (1), it is preferred that solution (1) comprises ascorbate and/or isoascorbate ions in a concentration between 0.1% to 10.0% w/w.

In such embodiments the solution (1) preferably comprises at least 0.2, at least 0.3, at least 0.4, at least 0.5, at least 0.75, at least 1.0, at least 1.5, at least 2.0, at least 2.5, at least 3.0, at least 3.5, at least 4.0, at least 4.5, at least 5.0, at least 5.5%, at least 6.0, at least 6.5, at least 7.0, at least 7.5, at least 8.0, at least 8.5, at least 9.0, at least 9.5% w/w ascorbate and/or isoascorbate ions.

In such embodiments the upper limit of the ascorbate and/or isoascorbate ions in solution (1) is 10.0% w/w, preferably 9.5, 9.0, 8.5, 8.0, 7.5, 7.0, 6.5, 6.0, 5.5, 5.0, 4.5, 4.0, 3.5, 3.0, 2.5, 2.0, 1.5 or 1.0% w/w.

More preferably, when ascorbate and/or isoascorbate ions are added to the alkaline solution (1), it is preferred that solution (1) comprises ascorbate and/or isoascorbate ions in a concentration between 0.5% to 5.0% w/w, even more preferably 1.0% to 2.0% w/w.

A suitable range can be selected from the lower and upper values in accordance with the specific process conditions, composition of the solution (1) and the food to be treated.

In a preferred embodiment ascorbate and/or isoascorbate ions are added to the solution (1), until solution (1) has a pH 10.0, more preferred 11.0 most preferred 12.0.

As mentioned above, generally, the process conditions and composition and concentrations of the solutions (1) and (2) of the present invention can be selected and controlled within the claimed ranges to achieve the desired effects. For example, when using a solution (1) with higher pH values, e.g. pH 12.0, a concentration of ascorbate/isoascorbate ions in solution should be selected which is capable to achieve the desired neutralization. In cases of using an alkaline solution (1) with a pH 12.0 and without addition of ascorbate/isoascorbate ions in solution (1) the lower limit of the ascorbate and/or isoascorbate ions in solution (2) is preferably at least 0.75, at least 1.0, at least 1.5, at least 0.75, at least 2.0% w/w. However, in embodiments, wherein the alkaline solution (1) also contains ascorbate/isoascorbate ions, the concentration of the ascorbate and/or isoascorbate ions in solution (2) can be selected from the whole range defined herein, i.e. from 0.5% to 25% w/w.

The pH values of the solution (1) and of the solution (2) should be selected independent of one another. The solution (2) should have a pH low enough (acidic) to reverse the pH of the food products treated with the alkaline solution (1) to neutral pH or below. If no sufficient neutralization or acidification of the treated food is achieved with the solution (2) and in case the treated food products remain with an alkaline pH of e.g. pH>8.0 after the preservation treatment this may lead to undesired deterioration, such as discoloration and browning of the food due to tissue damage. It is therefore desirable to control the pH of the solutions (1) and such that in or after the step of treatment with solution (2) the pH will not become alkaline, but preferably will be ≤pH 8.0, preferably of ≤pH 7.5, more preferably of ≤pH 7.0, more preferably of ≤pH 6.5, more preferably ≤pH 6.0, more preferably of ≤pH 5.5, more preferably of ≤pH 5.0, more preferably of ≤pH 4.5, even more preferably ≤pH 4.0 and most preferably a pH value between of 3.0 and 5.0.

The method of preserving food, in particular fresh produce, according to the invention is preferably carried out at ambient temperature/normal conditions. In any case, the temperature of the solution (1) and/or the solution (2) should not exceed boiling temperature and should be controlled to avoid boiling or cooking or otherwise temperature-induced deterioration of the fresh food, in particular fresh produce. The temperature of the applied solutions is preferably ≤50.0° C., more preferably is ≤40.0° C., even more preferably is ≤30.0° C. and most preferably is room temperature (20° C.±5° C.). It is also possible to carry out the process at temperature below 20° C. with cooled fresh food, in particular cooled fresh produce, however freezing of the solution(s) must be avoided.

A temperature below the boiling point is preferred, as this way the water retention of the food, in particular fresh produce, does not destroy the structure of the treated food. Even lower temperatures are preferred, such as below 40-50° C., because on one hand, depending on the temperature, proteins and/or vitamins in the fresh food, in particular in fruits and vegetables, may denature or be destroyed at higher temperatures and the treated food may be therefore less nutritious and on the other hand, the structure of the fresh food may soften at such temperature leading to loss of its crunchy structure, as for example with apples or nectarines. At a temperature of 20° C. and especially at a temperature around 20° C. or below, it can generally be ensured that the treatment has little to no effect regarding the structure of the food, in particular fresh produce, especially with regard to alkaline treatment and acidic treatment. Furthermore, the lower temperature of the treatment, especially of the solution (1), but also of the solution (2), allows a longer treatment period, since etching, the browning-reaction and degradation of the structure occurs later. The longer treatment time allows the microbial infestation to be further reduced without having negative impact on the structure of the fresh food, in particular fresh produce.

It is known to use alkaline solutions for treating fruits and vegetables. However, known alkaline treatments aim at chemical peeling of fruits and vegetables and are usually carried out with significantly higher concentrations of the alkaline compound and under steam or high temperatures. In contrast the method of the present invention is neither used nor suitable for such an alkaline/chemical peeling process. The present method differs in the processing conditions such as lower temperatures and lower alkali concentrations.

In the process of the present invention no final washing step is necessary, as the alkaline solution (1) and the acidic solution (2) neutralize each other. This is a clear procedural advantage with respect to saving time and resources.

The process of preserving food, in particular fresh produce, described herein may comprise one or more further steps selected from step (e) drying, sieving, centrifuging, air-blowing, draining, packaging, or confectioning and combinations thereof.

In the sense of the present invention the term "food" relates to any food which may be prone to oxidation. The term "food" comprises processed food like cut, sliced, or peeled vegetables or fruits. The invention particularly relates to fresh food, more particularly to fresh produce. Nevertheless, it is also possible to apply the method of the invention to dried or semi-dried fruits and vegetables.

Fresh produce in the sense of the invention, relates to fresh food such as vegetables, fruits and herbs. In the sense of the invention fresh food relates to food, that was not processed with chemical or physical preservation measures, such as in particular the above excluded chemical preservation methods or heat or steam conservation methods. In the sense of the present invention, fresh produce taxonomically belonging to fungi, such as champignons, mu err, porcino, chanterelle and any other mushrooms, are considered to be comprised by the term vegetables.

In the sense of the present invention, the term "fresh produce" in particular comprises fresh fruit and vegetables. Primarily, but not exclusively, such fresh fruit and vegetables are farm-grown.

In the sense of present invention, the term "fresh produce" further comprises fruits and vegetables that are either in the same state as they were harvested, or have been peeled, sliced, chopped or submitted to any means for reducing size or providing bite-size portions of fruits and vegetables, such as slicing, chopping, cutting or peeling. Herbs may be also be present in cut form.

In a preferred embodiment the method of preserving the food, in particular fresh produce, is applied to fresh cut produce. Especially, fresh cut produce is prone to etching and/or browning. Treatment of fresh cut produce with solution (1) and solution (2) in accordance with the process of the present invention protects this cut produce in particular.

Fresh produce and/or fresh cut produce to be preserved with the method of the present invention may be selected from the group of fresh fruits comprising apples, avocados, rhubarb, melons, pineapple, cherries, strawberries, nectarines, peaches, kiwi, lemons, oranges, apricot, coconut, grapes or dragon fruit; fresh produce and/or fresh cut produce from the group of fresh vegetables may be selected from the group comprising pears, potatoes, carrots, lettuce, leeks, onions, rutabaga, kale, mushrooms, garlic, peppers, tomatoes fennel, asparagus, beans, peas, broccoli, cauliflower, Brussel sprouts, cabbage, celery, chard, corn, endive, leafy greens, okra, chili, beetroot, turnip, ginger, radish, squashes, courgette, pumpkin, artichoke, sweet potato, ginger, turmeric, eggplant or zucchini as well as fungi (as defined above); fresh produce and/or fresh cut produce from the group of fresh herbs may be selected from basil, parsley, mint, dill, sage rosemary, thyme, cilantro, fennel, chamomile, lemongrass, oregano, chives, or watercress.

The method for preserving fresh cut produce is preferably applied to:
fresh cut produce selected from fruits consisting of apple, rhubarb, melon, pineapple, coconut, strawberries, grapes or kiwi;
fresh cut produce selected from vegetables consisting of carrots, tomatoes, peppers, zucchini, leafy greens, mushrooms or eggplant;
fresh cut produce selected from herbs consisting of basil, parsley, mint, cilantro or chives.

The method for preserving fresh cut produce is preferably applied to:
apples, melon, pineapple, strawberries, coconut, grapes, or leafy greens.

The invention further relates to a combination of a solid composition (1) and a solid composition (2), ready for dissolution in a suitable solvent, preferably water or mixtures of water with other water miscible solvents as defined above, for providing the solution (1) and/or the solution (2) as defined herein. Alternatively, the invention covers a combination of the ready-to-use solutions (1) and (2) for carrying out the herein described process.

A further aspect of the invention relates to a kit-of-parts combination (kit-of-parts product) comprising:
a) the solution (1) as defined above;
b) the solution (2) as defined above;
in a separated special arrangement; and optionally one or more of
c) an instruction leaflet, and/or
d) container for the parts to be treated like a box or a bag, for example made from plastic, or any other suitable container made from any other suitable material or single-use devices for carrying out the process of the invention, like tubes, falcons, cuvettes, bottles, syringes, dispenser, phials etc. made from plastic, glass, or other suitable material
e) optionally a container for packaging and/or storing the parts to be treated or the parts after treatment.

In a further embodiment the invention relates to a kit-of-parts combination (kit-of-parts product) comprising:
a) the compounds, in particular salts, for preparing the solution (1) as defined above;
b) the compounds, in particular salts, for preparing the solution (2) as defined above, in a separated special arrangement;
c) optionally solvents as defined above for dissolving the compounds for solution (1) and (2); and
d) an instruction leaflet, and/or
e) container wherein the compounds a) and/or the compounds b) can be dissolved for preparing the solutions (1) and (2), like tubes, falcons, cuvettes, bottles, phials etc., made from plastic, glass, or other suitable material; and/or
f) container for the parts to be treated like a box or a bag, for example made from plastic, or any other suitable container made from any other suitable material or single-use devices for carrying out the process of the invention, like tubes, falcons, cuvettes, bottles, syringes, dispenser, phials etc. made from plastic, glass, or other suitable material;
g) optionally a container for packaging and/or storing the parts to be treated or the parts after treatment.

This embodiment is particularly preferred, if the solvent for preparing solution (1) and (2) is water, which then needs not to be included in the kit-of-parts.

The instruction leaflet may in particular comprise instructions for preparing the solutions (1) and (2) and for the treatment conditions of the fresh food.

The kit-of-parts described herein are intended for the use in a method for preserving fresh food, in particular fresh produce as described herein.

EXAMPLES

The present invention is further illustrated by the following examples, without being limited thereto.

A. Microbial Log Reduction Test and Sensorial Evaluation

Microbial log reduction can be carried out with the following test conditions:

I. Preparation of (solid) agar-plates according to instruction paper (if necessary adapt to pH-value with NaOH or HCl):
  1 VRBD-Agar:
    41.5 g/l distilled water; sterilization 118° C. for 15 min.
  2. YGC-Agar:
    40.2 g/l distilled water; sterilization 121° C. for 15 min.
  3. LB-Agar:
    10 g/l Tryptone
    5 g/l NaCl
    5 g/l Yeast
    extract 2.5 g/l
    Glucose
    15 g/l Agar
    pH 7.5
    distilled water; sterilization 121° C. for 21 min.
II. Weighing of products (fruits/vegetables); add preferred amount of liquid medium and pestle until receiving a homogenous mixture. Easiest is to use 1 ml per gram product, since then the titer is directly cfu/g product. If there is not enough liquid present, use a higher amount of medium. Take care to adjust the titer appropriately.
III. Preparation of serial dilution (0, −1, −2, −3 . . . ; depending on the expected bioburden)
IV. Plating of content of 1.5 ml reaction tubes (e.g.) on (solid) agar plates by transferring 100 µl of a measured homogenous mixture of the test sample (e.g. fruits/vegetables) on the agar surface; if Enterobacteriaceae are to be detected, preparation of a fresh VRBD-Agar-solution is needed, that is to be poured on top (between 45° and 50° C.) to create an anaerobic layer to ensure a fermentation process.
V. After 18-24 hours (VRBD)/48 hours (LB)/(3-)7 days (YGC) at 37° C. (VRBD), resp. room temperature (LB, YGC) colony forming units per ml (CFU/ml) are counted; the titer is determined. LB gives the mesophilic aerobic total bacterial count, VRBD the one for *Enterobacteria*, and YGC the total count for fungi. For YGC a differentiation between yeasts and fungi has to be done optically. For VRBD, disregard colonies growing on the surface. Violet colonies in the agar suggest acid production, light colonies do not produce acid.

The tests are based on the official procedure for evaluation of bacterial contamination. Differences are the medium used for total bacterial count and the incubation temperature for LB and YGC (room temperature instead of 25° C.).

Example A-1: Control

Sliced parts of pineapple without any treatment for five days constitute the control.
  After five days a significant growth of bacteria, yeast and fungi and sensorial deterioration was detected.

Comparative Example A-2: Treatment with Ascorbic Acid Solution (pH 2.4)

Sliced parts of pineapples, similar as in Example A-1, were treated by applying an ascorbic acid solution (pH 2.4) with a concentration of 6% w/w.
  A significant growth of bacteria, yeast and fungi, but lesser sensorial deterioration was detected.

Comparative Example A-3 Treatment with 0.4 PPM $ClO_2$ Solution

Sliced parts of pineapples, similar as in Example A-1, were treated by applying 0.4 ppm $ClO_2$ solution (6% w/v). The quotient corresponds to the permitted value determined by the
  Drinking Water Ordinance (TrinkwV) of the Federal Republic of Germany and is commonly used as a disinfectant.
  A 0.5 log reduction of bacterial, yeast and fungi infestation, but sensorial deterioration after 5 days was detected.

Comparative Example A-4: Treatment with 80 PPM Peroxyacetic Acid Solution

Sliced parts of pineapples, similar as in Example A-1, were treated by applying 80 ppm peroxyacetic acid solution. The quotient corresponds to the permitted value determined by the US FDA limitation for washing fruits and vegetables and is commonly used as a disinfectant in the area of use.
  A log reduction of 1 of bacterial, yeast and fungi infestation, but sensorial deterioration after 5 days was detected.

Comparative Example A-5: Treatment with 1% (w/w) Sodium Hydroxide Solution

Sliced parts of pineapples, similar as in Example A-1, were treated by applying 1% (w/w) sodium hydroxide solution [corresponding to solution (1) of the present invention].
A log reduction of 1-2 of bacterial, yeast and fungi infestation, but significant sensorial deterioration was detected.

Comparative Example A-6: Treatment with 0.4 PPM ClO2 Solution and Subsequent Treatment with Ascorbic Acid Solution (pH 2.4)

Sliced parts of pineapples, similar as in Example A-1, were treated by applying 0.4 ppm $ClO_2$ solution (6% w/v) and afterwards ascorbic acid solution (pH 2.4) with a concentration of 6% w/w [corresponding to solution (2) of the present invention] was applied on the same test material.
A 0.5 log reduction of bacterial, yeast and fungi infestation, but lesser sensorial deterioration was detected.

Comparative Example A-7: Treatment with 80 PPM Peroxyacetic Acid Solution and Subsequent Treatment with Ascorbic Acid Solution (pH 2.4)

Sliced parts of pineapples, similar as in Example A-1, were treated by applying 80 ppm peroxyacetic acid solution and afterwards ascorbic acid solution (pH 2.4) with a concentration of 6% w/w [corresponding to solution (2) of the present invention] was applied on the same test material.
A log reduction of 1 of bacterial, yeast and fungi infestation, but lesser sensorial deterioration was detected.

Example A-8: Treatment with 1% (w/w) Sodium Hydroxide Solution [Solution (1)] and Subsequent Treatment with Ascorbic Acid Solution (pH 2.4) [Solution (2)]

Sliced parts of pineapples, similar as in Example A-1, were treated by applying 1% (w/w) sodium hydroxide solution [corresponding to solution (1) of the present invention] was applied on the test material and afterwards ascorbic acid solution (pH 2.4) respectively with a concentration of 6% w/w [corresponding to solution (2) of the present invention] was applied on the same test material.
A log reduction of 2 of bacterial, yeast and fungi infestation and better sensorial character for up to 8 days was detected.

Reverse Effect of Discolored Fresh Produce

Comparative Example B-1.1: Treatment of Onions with 1% (w/w) Sodium Hydroxide Solution [Solution (1)]

1% (w/w) sodium hydroxide solution [corresponding to solution (1) of the present invention] was applied onto sliced parts of onions which caused immediate discoloration over the entire storage time of 14 days.

Example B-1.2: Treatment of Onions with 1% (w/w) Sodium Hydroxide Solution [Solution (1)] and Subsequent Treatment with Ascorbic Acid Solution (pH 2.4) [Solution (2)]

The test material was treated with the hydroxide solution (1) according to Example B-1.1 and subsequently an ascorbic acid solution (2) (pH 2.4) with a concentration of 6% w/w [solution (2)] was applied onto the same test material immediately thereafter. Surprisingly, the discoloration was not only stopped but even reversed and the test material took the original appearance as before the hydroxide treatment. This appearance was maintained during the entire storage time of 14 days.

Comparative Example B-2.1: Treatment of Sliced Apples with 1% (w/w) Sodium Hydroxide Solution [Solution (1)]

1% (w/w) sodium hydroxide solution [corresponding to solution (1) of the present invention] was applied onto sliced parts of apple which caused significant discoloration within 1-2 minutes over the entire storage time of 21 days.

Comparative Example B-2.2: Treatment of Sliced Apples with Ascorbate Solution (pH 2.4) [Solution (2)]

An ascorbate solution (pH 2.4) with a concentration of 6% w/w [corresponding to solution (2) of the present invention] was applied onto sliced parts of apple which only prevented discoloration to a certain extent, as some apple slices still turned brown.

Example B-2.3: Treatment of Sliced Apples with 1% (w/w) Sodium Hydroxide Solution [Solution (1)] and Subsequent Treatment with Ascorbic Acid Solution (pH 2.4) [Solution (2)]

The test material was treated according to Example B-2.1 and an ascorbic acid solution (2) (pH 2.4) with a concentration of 6% w/w [solution (2)] was applied onto the same test material immediately thereafter. The discoloration was prevented more effectively. This appearance was maintained during the entire storage time of 21 days. The sodium ions of the sodium hydroxide solution significantly improved the anti-browning effect and prevented the discoloration more effectively.

The results are summarized in Table 1 as follows:

TABLE 1

| Experiment | | Example B-1.1 | Example B-1.2 | Example B-2.1 | Example B-2.2 | Example B-2.3 |
|---|---|---|---|---|---|---|
| Solution (1) | 1% (w/w) NaOH | + | + | + | − | + |
| Solution (2) | Ascorbic acid (pH 2.4/6% w/w) | − | + | − | + | + |
| Solvent | | water | water | water | water | water |
| Deterioration/Etching | | ++ | Reversed | | | — |
| Discoloration/Browning | | ++ | Reversed Preserved up to 14 days | ++ | + | Preserved up to 21 days |

B. Comparative Tests

Comparative experiments with compositions described in the prior art U.S. Pat. Nos. 6,500,476 and 5,919,507 (Table 1) have been carried out to show the improvements and surprising effects achievable with the new method of the present invention over the claimed range (Table 2 and 3).

Test Conditions:
  Storage: 5-8° C. Packing type: Plastic Trays
  Piece size: Very thin slices, machine cut
  Test duration: 6 Days Pieces of fresh cut carrots are treated with the different test solutions and evaluated with respect to their log reduction as described in Example A above.

Further, the optical appearance was examined by a visual (optical) evaluation of the treated test pieces and the anti-browning rate was determined according to the following formula 100−(number of test pieces affected by browning/total number of test pieces)×100=anti-browning rate [%].

Therein, the anti-browning rate (%) indicates the proportion of test pieces without browning. This means that a higher anti-browning rate correlates to a better anti-browning performance.

Figure 1:
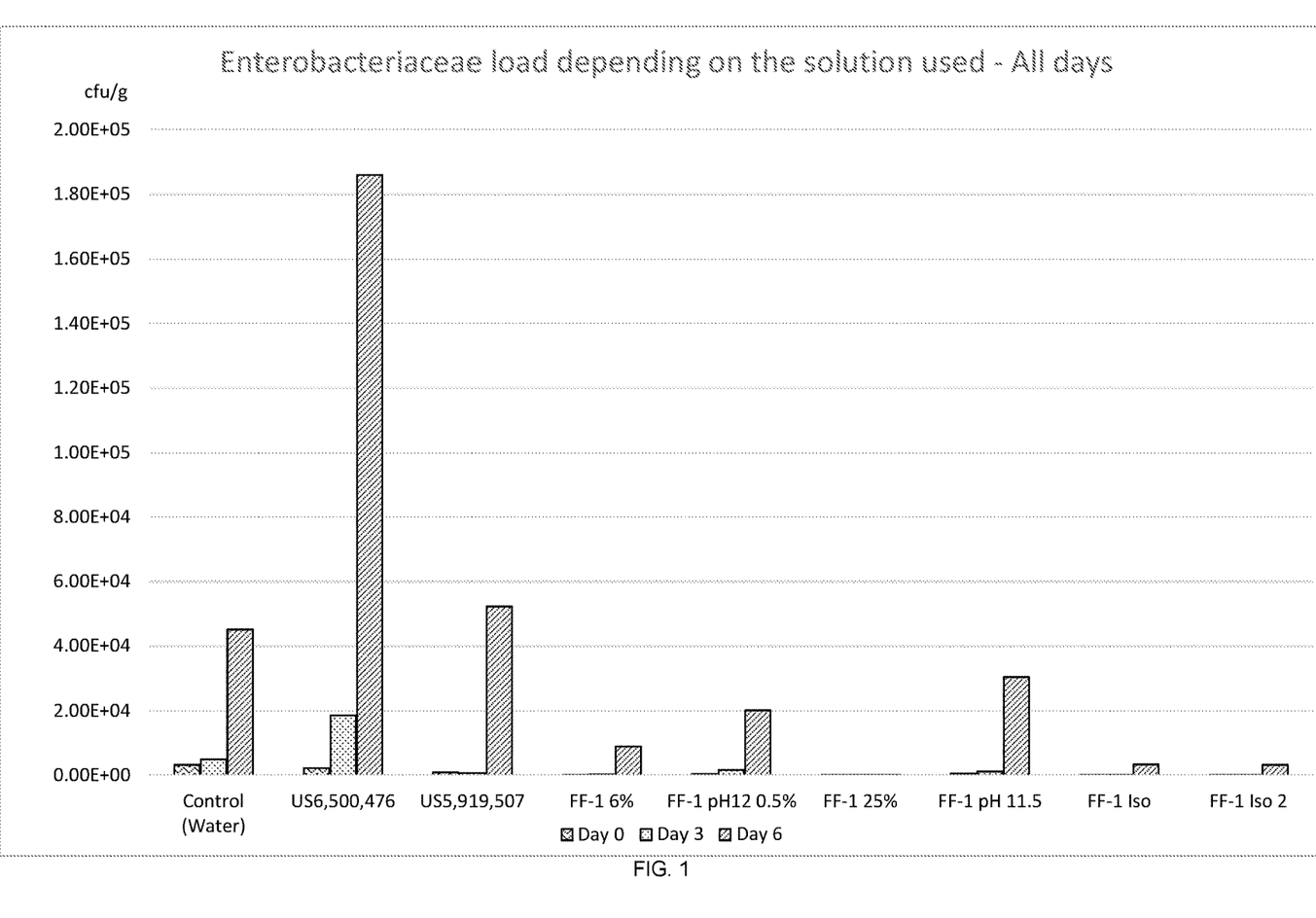
FIG. 1 Microbiological load of comparative preservative solutions and solutions according to the invention on day 0, 3 and 6.
Figure 2:
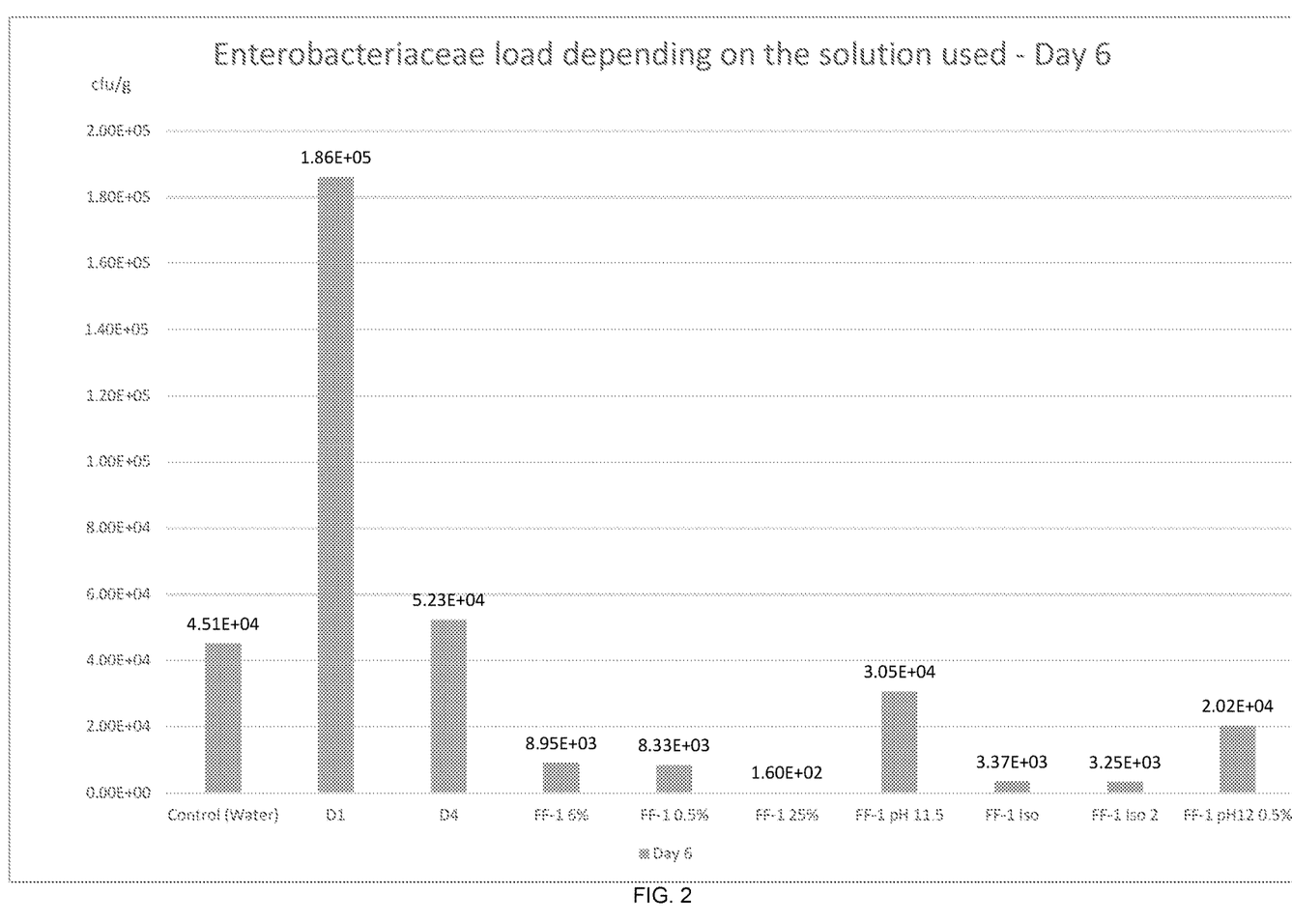
FIG. 2 Microbiological load of comparative preservative solutions and solutions according to the invention on day 6.
Figure 3:
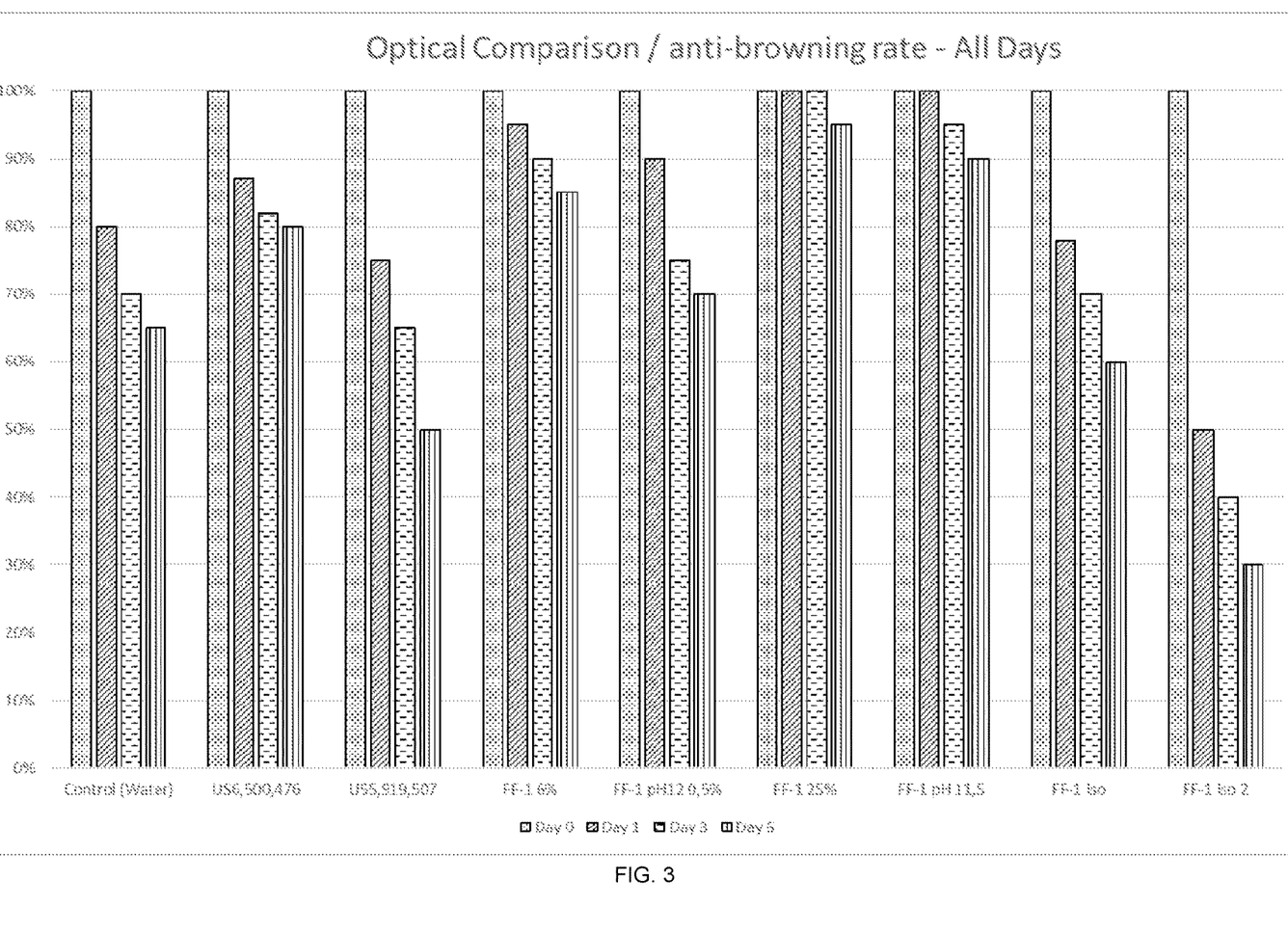
FIG. 3 Optical evaluation (anti-browning evaluation) of comparative preservative solutions and solutions according to the invention on day 0, 3 and 6.

FIGS. 1, 2 and 3 illustrate the results of the following Tables 1 to 3 further.

TABLE 1

| Solution/ | 1 Control | | | 2 Comparative Example over U.S. Pat. No. 6,500,476 | | | 3 Comparative Example over U.S. Pat. No. 5,919,507 | | |
|---|---|---|---|---|---|---|---|---|---|
| Composition | % | g/Solution | | % | g/Solution | | % | g/Solution | |
| Solution (1) | 100.00% | 2000 | Water | 0.42% | 8 | $Na_2CO_3$ | 4.20% | 84 | $NaHCO_3$ |
| | | | | 0.08% | 2 | $NaHCO_3$ | pH11 | | 50% NaOH |
| Solution (2) | 100.00% | 2000 | Water | 0.60% | 12 | Citric acid | 0.60% | 12 | Isoascorbic acid |
| | | | | | | | 2.40% | 48 | Na-Isoascorbate |
| | | | | 0.80% | 16 | Na-Citrate | 0.10% | 2 | EDTA |
| | | | | | | | 0.10% | 2 | $CaCl_2$ |
| Solution (3) | | | | 2.00% | 40 | Na-Isoascorbate | | | |
| | | | | 0.10% | 2 | EDTA | | | |
| | | | | 0.10% | 2 | $CaCl_2$ | | | |
| Comment | To verify effectiveness of other solutions over neutral water treatment | | | "Best solution" according to U.S. Pat. No. 6,500,476 | | | "Best solution" according to Comparative Example over U.S. Pat. No. 6,500,476 and U.S. Pat. No. 5,919,507 | | |
| Dipping time | 2 dips, 1 minute each | | | $1^{st}$: 30 s; $2^{nd}$: 15 s; $3^{rd}$: 15 s | | | $1^{st}$ d: 120 s; $2^{nd}$ d: 60 s | | |
| Conductivity b. [mS] | 0 | | | 7.1 | 3.8 | 6.5 | 1 d: 53 | 2 d: 8.25 | | |
| Conductivity a. [mS] | 0.60 | | | 6.05 | 4.0 | 6.9 | 1 d: 49.5 | 2 d: 12.5 | | |
| pH Value before | 7.55 | | | 10.38 | 5.3 | 5.7 | 1 d: 11.0 | 2 d: 4.69 | | |
| pH Value after | 7.25 | | | 10.3 | 5.3 | 5.34 | 1 d: 11.22 | 2 d: 8.96 | | |
| Mibi results Ø n = 4 | Day 0 | Day 3 | Day 6 | Day 0 | Day 3 | Day 6 | Day 0 | Day 3 | Day 6 |
| Enterobacterales | 3.25E+03 | 4.99E+03 | 4.51E+04 | 2.19E+03 | 1.86E+04 | 1.86E+05 | 8.77E+02 | 6.76E+02 | 5.23E+04 |
| anti-browning rate | 100% | 70% | 65% | 100% | 82% | 80% | 100% | 65% | 50% |

TABLE 2

| Solution/ | 4 FF-1 6% Asc. | | | 5 FF-1 0.5% pH 12 | | | 6 FF-1 25% Asc. | | |
|---|---|---|---|---|---|---|---|---|---|
| Composition | % | g/Solution | | % | g/Solution | | % | g/Solution | |
| Solution (1) | 1.00% | 40 mL | 50% NaOH | pH 12 | 5.5 mL | 50% NaOH | 1.00% | 40 mL | 50% NaOH |
| Solution (2) | 6.00% | 120 | Ascorbic acid | 0.50% | 10 | Ascorbic acid | 25.00% | 500 | Ascorbic acid |
| Comment | Present invention Lower middle of claimed range in Solution (2) | | | Present invention Lower limit of claimed range in Solution (2) and Solution (1) with pH 12.0 | | | Present invention Upper limit of claimed range in Solution (2) | | |
| Dipping time | 2 dips, 1 minute each | | | 2 dips, 1 minute each | | | 2 dips, 1 minute each | | |
| Conductivity b. [mS] | 1 d: 140 | 2 d: 1.45 | | 1 d: 4.5 | 2 d: 0.6 | | 1 d: 140 | 2 d: 2.0 | |
| Conductivity a. [mS] | 1 d: 65 | 2 d: 1.4 | | 1 d: 4.2 | 2 d: 0.622 | | 1 d: 65 | 2 d: 2.28 | |
| pH Value before | 1 d: 12.9 | 2 d: 2.66 | | 1 d: 12.0 | 2 d: 3.38 | | 1 d: 12.9 | 2 d: 2.35 | |
| pH Value after | 1 d: 12.5 | 2 d: 3.05 | | 1 d: 11.96 | 2 d: 3.61 | | 1 d: 12.5 | 2 d: 3.11 | |
| Mibi results Ø n = 4 | Day 0 | Day 3 | Day 6 | Day 0 | Day 3 | Day 6 | Day 0 | Day 3 | Day 6 |
| Enterobacterales | 3.83E+01 | 2.88E+02 | 8.95E+03 | 4.30E+02 | 1.66E+03 | 2.02E+04 | <10 | <10 | 1.60E+02 |
| anti-browning rate | 100% | 90% | 85% | 100% | 75% | 70% | 100% | 100% | 95% |

TABLE 3

| Solution/Composition | 7 FF-1 pH 11.5 | | | 8 FF-1 Iso-Asc. | | | 9 FF-1 Iso-Asc. 2 | | |
|---|---|---|---|---|---|---|---|---|---|
| | % | g/Solution | | % | g/Solution | | % | g/Solution | |
| Solution (1) | pH 11.5 | 0.64 mL | 50% NaOH | 1.00% | 40 mL | 50% NaOH | 1.00% | 40 mL | 50% NaOH |
| Solution (2) | 6.00% | 120 | Ascorbic acid | 0.60% | 12 | Iso-Ascorbic acid | 0.10% | 2 | Iso-Ascorbic acid |
| | | | | 2.40% | 48 | Na-Isoasc. | 2.90% | 58 | Na-Isoasc |
| Comment | Present invention Solution (1) pH 11.5 | | | Present invention Solution (2) like in Composition 3 (U.S. Pat. No. 5,919,507) | | | Present invention Solution (2) like in Composition 3 (U.S. Pat. No. 5,919,507), slightly acidic | | |
| Dipping time | 2 dips, 1 minute each | | | 2 dips, 1 minute each | | | 2 dips, 1 minute each | | |
| Conductivity b. [mS] | 1 d: 2.0 | 2 d: 1.45 | | | 1 d: 140 | 2 d: 6.35 | | | 1 d: 140 | 2 d: 7.21 | | |
| Conductivity a. [mS] | 1 d: 1.3 | 2 d: 1.4 | | | 1 d: 65 | 2 d: 8.75 | | | 1 d: 65 | 2 d: 9.93 | | |
| pH Value before | 1 d: 11.5 | 2 d: 2.66 | | | 1 d: 12.9 | 2 d: 5.1 | | | 1 d: 12.9 | 2 d: 6.04 | | |
| pH Value after | 1 d: 11.0 | 2 d: 3.05 | | | 1 d: 12.5 | 2 d: 10.7 | | | 1 d: 12.5 | 2 d: 11.3 | | |
| Mibi results Ø n = 4 | Day 0 | Day 3 | Day 6 | Day 0 | Day 3 | Day 6 | Day 0 | Day 3 | Day 6 |
| Enterobacterales | 5.59E+02 | 1.15E+03 | 3.05E+04 | 9.17E+01 | 5.50E+01 | 3.37E+03 | 1.75E+01 | 8.00E+01 | 3.25E+03 |
| anti-browning rate | 100% | 95% | 90% | 100% | 70% | 60% | 100% | 40% | 30% |

Discussion of the Results:

The FIGS. 1, 2 and 3 further illustrate the results over the test range of 0 to 6 days.

Microbial Assessment:

The solutions according to the prior art (U.S. Pat. Nos. 6,500,476 and 5,919,507; test solutions 2 and 3 in Table 1) both show a higher microbial load of *enterobacteria* compared to the ("FF") test solutions according to the invention (test solutions 4 to 9) over the test period of 6 days.

Table 1 further shows that the microbial load of the prior art solutions (U.S. Pat. Nos. 6,500,476 and 5,919,507; test solutions 2 and 3) is similar to that of a simple wash with water (Control) or even worse than water.

A comparison of test solutions 4 and 7 show, that a higher pH value provides even higher antimicrobial effects.

Test solution 8 further confirms the relevance of the pH value. Although comparative test solution 3 is nearly identical to test solution 8 according to the invention, the comparative test solution 3 provides significantly worse microbial results which leads to the conclusion that the higher pH value of solution 8 is the decisive factor here.

The results are illustrated in FIGS. 1 and 2, wherein FIG. 1 compares the results on days 0, 3 and 6, while FIG. 2 shows the final results on day 6. The superiority of the preservation treatments according to the invention is particularly apparent from this final result on FIG. 2.

Optical Evaluation:

Again, most test solutions according to the invention ("FF" samples) are superior over the test solutions according to the prior art (U.S. Pat. Nos. 6,500,476 and 5,919,507; test solutions 2 and 3 in Table 1).

Test solution 5 provides an example according to the invention with the solutions (1) and (2) having a concentration of active components covering the lower limits of the invention as defined herein and having a significantly higher pH value (pH 12) compared to the prior art solutions (U.S. Pat. Nos. 6,500,476 and 5,919,507; test solutions 2 and 3 in Table 1). This example according to the invention shows that the increased pH provides superior antimicrobial efficacy but nevertheless allows to maintain an acceptable anti-browning rate, which is still better than the results achieved with the prior art solution according U.S. Pat. No. 5,919,507 (test solution 3).

Overall, the prior art solution according to U.S. Pat. No. 5,919,507 (test solution 3) does not provide any good optical results at all and is even worse than the water control (test solution 1 in Table 1).

The results of the optical evaluation are illustrated in FIG. 3 comparing the results on days 0, 3 and 6.

The invention claimed is:

1. A method for preserving fresh food comprising the following steps:
   (a) providing an aqueous solution (1), wherein the aqueous solution (1) is an alkaline solution with a pH value≥12.0;
   (b) providing an aqueous solution (2), comprising 0.5% to 25% w/w ascorbate and/or isoascorbate ions;
   (c) applying the aqueous solution (1) on fresh food; and
   (d) in a subsequent step applying the aqueous solution (2) on said fresh food.

2. The method of claim 1, wherein the aqueous solution (1) comprises at least one hydroxide.

3. The method of claim 1, wherein the aqueous solution (1) comprises at least one hydroxide selected from the group consisting of calcium hydroxide, sodium hydroxide and potassium hydroxide.

4. The method of claim 1, wherein the aqueous solution (1) comprises at least one hydroxide with a concentration of 0.01% to 5% w/w.

5. The method of claim 1, wherein the aqueous solution (1) additionally comprises 0.1% to 10% w/w ascorbate or isoascorbate ions.

6. The method of claim 2, wherein the aqueous solution (1) additionally comprises 0.1% to 10% w/w ascorbate or isoascorbate ions.

7. The method of claim 1, wherein the aqueous solution (2) has a pH value that does not exceed 8.

8. The method of claim 1, wherein the aqueous solution (2) has a pH value in a range of 3.0 to 5.0.

9. The method of claim 6, wherein the aqueous solution (2) has a pH value in a range of 3.0 to 5.0.

10. The method of claim 1, wherein the temperatures of the aqueous solution (1) and of the aqueous solution (2) do not exceed 30° C.

11. The method of claim 1, wherein at least one of the aqueous solution (1) and the aqueous solution (2) further comprises at least one excipient approved for use in food.

12. The method of claim 1, wherein at least one of aqueous solution (1) and aqueous solution (2) is applied for at least 5 seconds.

13. The method of claim 1, wherein a time between application of the aqueous solution (1) and of the aqueous solution (2) does not exceed 1 hour.

14. The method of claim 1, wherein at least one of aqueous solution (1) and aqueous solution (2) is applied to the fresh food by at least one of spraying, sprinkling, dousing, dipping and immersing.

15. The method of claim 1, further comprising step (e):
(e) at least one selected from the group consisting of drying, sieving, centrifuging, air-blowing, draining, packaging and confectioning said fresh food.

16. The method of claim 1, wherein no additional washing or neutralization step is applied between the steps (c) and (d).

17. The method of claim 1, wherein presence of a chelating agent is excluded.

18. The method of preserving fresh food according to claim 1, wherein the fresh food is cut product selected from the group consisting of fresh fruits, fresh vegetables and fresh herbs.

* * * * *